June 18, 1929.  M. E. ANDREWS  1,718,021
BRAKE STRUCTURE FOR AUTOMOTIVE VEHICLES
Filed Sept. 7, 1926  2 Sheets-Sheet 1
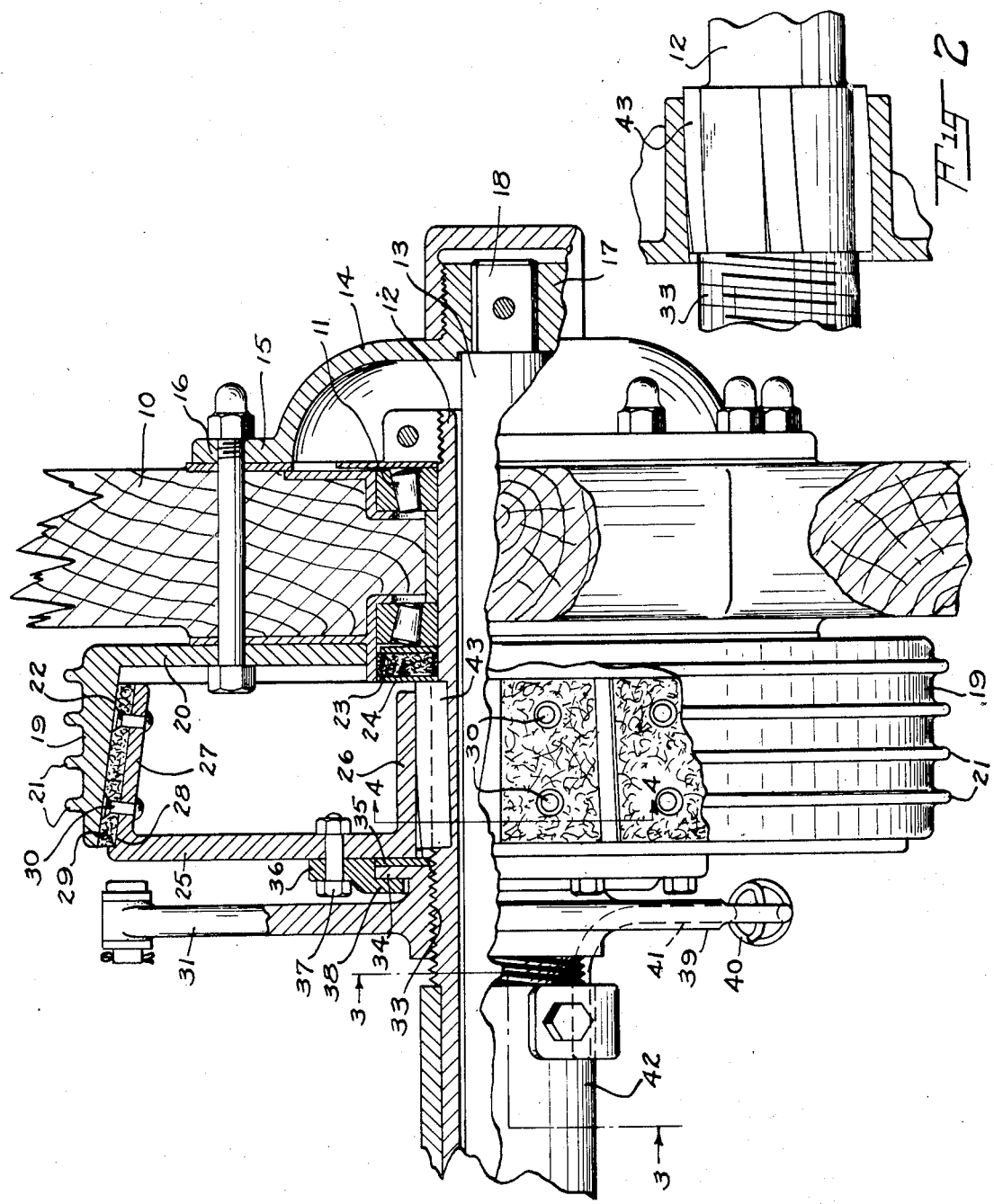
INVENTOR.
Mark Edwin Andrews
BY
ATTORNEY

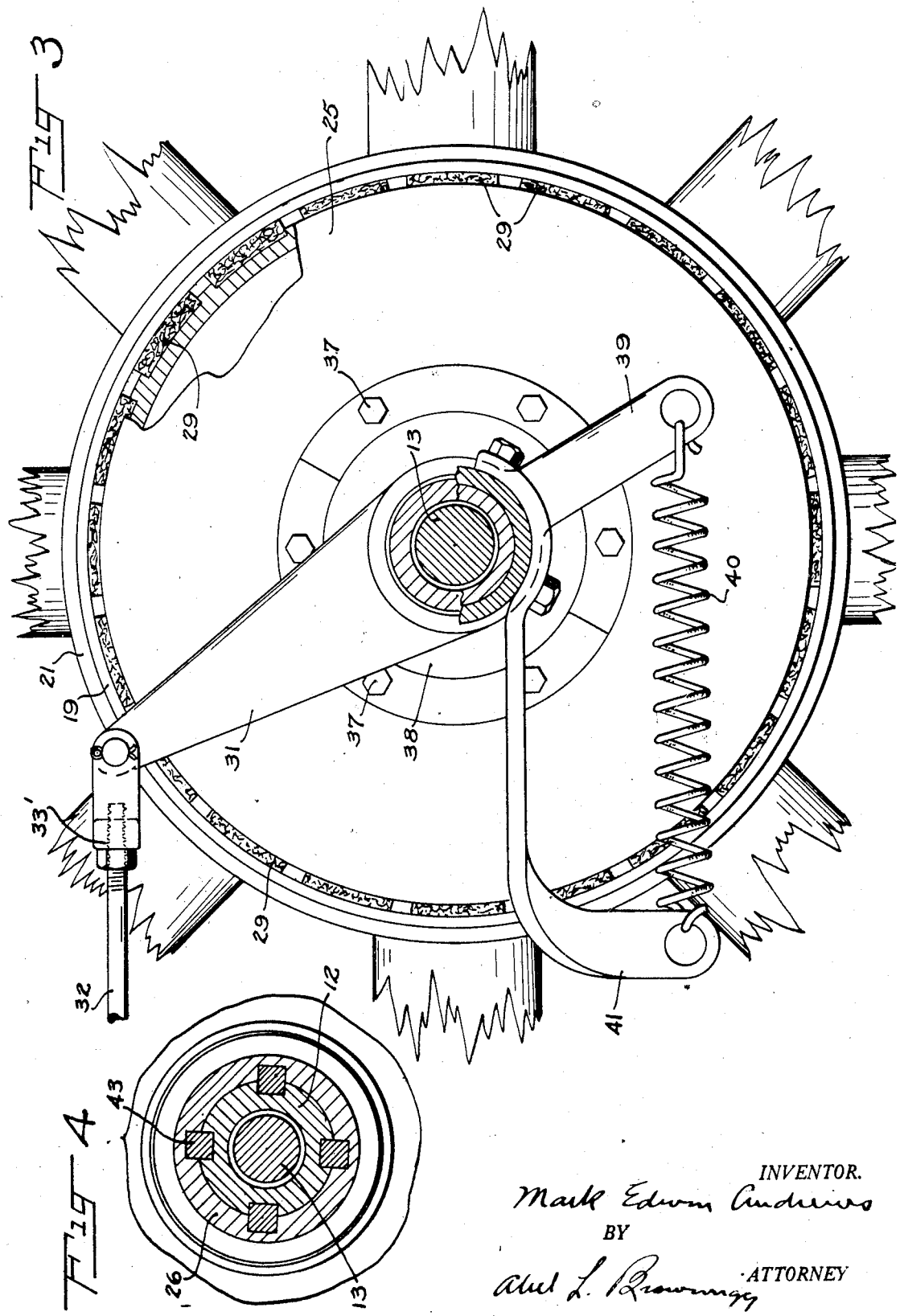

Patented June 18, 1929.

1,718,021

UNITED STATES PATENT OFFICE.

MARK EDWIN ANDREWS, OF KANSAS CITY, MISSOURI.

BRAKE STRUCTURE FOR AUTOMOTIVE VEHICLES.

Application filed September 7, 1926. Serial No. 133,753.

This invention relates generally to the construction of braking mechanism for use with automotive vehicles.

Although braking devices of the band and drum type have gone into extensive use in connection with the operation of automobiles, this type of brake structure is open to the objection that the hinged mounting of the brake band sections does not provide a fully effective operative contact of the friction band members with the cylindrical surface of the drum. This objectionable feature of prior constructions occurs by reason of a non-concentric disposition of the brake bands with the drum when in non-engaging position, and in a resulting excessive engagement of portions of the bands with the drum and a deficient engagement of other portions of the bands with the drum in effecting a braking operation. This undesirable non-uniform engagement of different portions of the bands with the drum results in an uneven distribution of wear in the bands with the result that the bands must be replaced because portions thereof are badly worn and although other and substantial portions are worn only to a relatively slight extent.

The construction described not only results in an unsatisfactory wearing action on the brake bands but the irregular and non-uniform application of the bands to the drum gives rise to an inefficient braking operation.

A general object of the present invention is to provide a brake construction for automotive vehicles which will be free from the objections referred to and which will uniformly utilize the full frictional surfaces of the braking members in the braking operations and which will provide a particularly effective braking effect.

With these and other objects in view, the invention comprises a brake structure of the cone type so constructed that a powerful braking effect is produced. The braking action is supplemented by the mounting of the inside or cone member on key members having a slight pitch or inclination, so that the rotating action of the drum assists in drawing the cone into braking position.

Another feature of the invention resides in the provision of a friction band member formed of segments, individually attached to the peripheral surface of the cone member and capable, if the occasion arises, of being individually replaced.

Still another feature of the invention resides in the use of a lever having threaded engagement with a supporting shaft and arranged when rotated on the shaft to force the adjacent cone member along the shaft into or out of frictional engagement with the drum.

Other features of the invention will be hereinafter referred to.

In the drawings, in which a preferred embodiment of the invention has been selected for illustration:—

Figure 1 is a view partly in side elevation and partly in vertical section of an automotive vehicle brake embodying the invention;

Figure 2 is a sectional view of a detail of the mechanism shown in Figure 1;

Figure 3 is a view in end elevation and partly in vertical section taken on the line 3—3 of Figure 1;

Figure 4 is a view in vertical section taken on the line 4—4 of Figure 1.

Referring to the drawings for a more detailed description of the invention, the hub portion of an automotive vehicle wheel is shown at 10 mounted to rotate on suitable bearings 11 on a hollow shaft member 12 in a known manner. The wheel 10 is coupled to a driving axle 13 through a hub member 14 having an annular flange member 15 which is bolted at 16 to the wheel structure. The hub member 14 is provided with a centrally disposed boss 17 to which the reduced end 18 of the axle member 13 is connected in such manner that rotation of the axle member conveys rotative motion through the hub member 18 to the wheel 10.

On the inner side of the wheel 10 a brake drum 19 having a cup-shaped formation with a base member 20 is attached by means of the same bolt member 16 which connects the hub member 14 to the wheel 10. The drum member 19 is provided with reinforcing flanges 21 on the external surfaces of the annular wall member and with an inner face 22 which converges inwardly toward the base member 20, thus forming a frusto-conical inner wall surface. The drum member 19 is cut away at its central portion to permit the wheel shaft structure to pass therethrough and a felt washer 23 is mounted in a holder 24 to prevent oil from seeping from the bearing structure 11 into the brake structure of which the drum 19 forms a part.

The drum member 19 is arranged to cooperate with an inside or cone brake member 25 which is provided with a hub member 26 mounted to inclose the hollow shaft member 12 already referred to and to have limited movement longitudinally or axially thereof. The cone member is provided with an annular flange member 27 having a frustconical formation and arranged with seating recesses 28 formed to receive sections 29 of suitable friction or brake lining material. The brake lining sections 29 are individually attached to their seats by means of rivets 30 or equivalent. The brake lining sections 29 are adapted to engage the inner surfaces 22 of the drum member 19, the drum member 19 and the inside brake member 25 forming the cooperating members of a cone type brake.

The cone type brake structure thus described is effective to produce a powerful braking action not only through the inherent nature of the general type of brake structure but also by reason of the sectional brake lining provided through which frictional contact is provided between the peripheral surface of the cone member 25 and substantially the entire superficial area of the brake drum surface 22.

In order to actuate the brake thus described an actuating lever 31 is provided which includes a cylindrical hub portion formed in the lever member 31 intermediate its ends and adapted to have a screw threaded connection 33 with the external surface of the shaft structure 12 already referred to.

One extremity of the lever 31 is connected through a suitable link 32 with a foot or hand operating lever (not shown) for actuation by the driver of the vehicle. At 33' there is provided an adjustable connection between the link 32 and the end of the lever 31 through which the angular position of the lever 31 can be adjusted to thereby adjust the effectiveness of the braking structure.

Through the screw threaded connection referred to between the actuating lever 31 and the shaft 12 longitudinal movement of the lever 31 with relation to the shaft 12 is produced when the lever is rocked about the shaft 12 as a center.

This movement of the lever 31 longitudinally of the shaft 12 is conveyed to the brake cone member 25 with the result that the cone member is moved into and out of peripheral engagement with the inner annular surface 22 of the brake drum member 19.

In order to thus convey motion from the lever 31 to the brake cone member 25, the hub member 32 of the lever 31 is provided with a radial flange member 34 between which and the confronting face of the cone member 25 a washer 35 is placed and through which motion is conveyed from the lever structure to the drum member in a direction to produce braking engagement of the cone member with the drum 19. In order to effect a withdrawing movement of the cone member from braking position upon movement of the lever 31 in the opposite direction, an annular flange member 36 is attached to the face of the cone member 25 by means of bolts 37, the inner periphery of the flange 36 terminating in a holding member 38 which engages the inner surface of the radial flange 34 formed on the hub member 32. With this arrangement, it will be seen that a withdrawing movement of the lever and the connected flange member 34 produces a like movement in the cone member structure 25 to thereby withdraw the cone member braking engagement with the brake drum 19. For convenience in assembly the flange member 36 which is attached to the cone member 25 is formed in sections, as will be clear.

The other extremity 39 of the lever 31 is connected with a pull spring 40 which is attached at its opposite end to an anchoring arm 41 attached to the external surface of a tubular member 42 which encases the tubular shaft 12. With this arrangement it will be seen that the spring 40 actuates to product an automatic separation of the brake members when the foot pedal or other manual actuating means is released by the operator.

Another feature of the invention resides in the provision of inclined key members 43 for connecting the hub member 26 of the cone brake member 25 with the shaft 12. The inclination of the key members 43 which is best shown in Figure 2 of the drawings, is such that the rotating action of the brake drum 19 acts when the key member makes contact therewith to assist in the bringing about of an effective braking action by drawing the cone member into more effective braking position when the engagement is thus effected. It will be seen that the inclination or pitch of the key members 43 produces what is in effect a portion of a helix so that a screw action is imparted to the cone brake member 25. This automatic action by which the power of the rotating wheel 10 is utilized to assist in bringing about the full braking action is a useful feature of the invention and insures the production of a powerful braking effect. This feature of the invention is particularly useful in connection with heavy automobile trucks wherein an effective braking action is particularly required.

While I have described the improved brake as particularly adaptable for use on vehicles of the automotive type, the brake is also capable of use on vehicles of other types and in other situations where braking mechanism of this general type can be successfully employed.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a brake construction for automotive vehicles, a cup-shaped drum member attached at its base portion to the inner side of a wheel of the vehicle, the inner surface of the annular wall of the drum converging toward its base portion, a cone member provided on its outer peripheral surface with friction material for engagement with the inner surface of the annular wall of the drum, inclined key members connecting the cone members to the shaft on which the wheel rotates, and a lever having threaded engagement with the shaft and adapted to be partially rotated to force the cone member into and out of braking engagement with the drum.

2. In a brake construction for automotive vehicles, a cup-shaped drum member attached at its base portion to the inner side of a wheel of the vehicle, the inner surface of the annular wall of the drum converging toward its base portion, a cone member provided on its outer peripheral surface with friction material for engagement with the inner surface of the annular wall of the drum, said friction material being attached to the cone member in segmental sections, inclined key members connecting the cone members to the shaft on which the wheel rotates, the inclination of the key members being such that the rotation of the drum tends to draw the cone into braking position, a lever having threaded engagement between its ends with the shaft, said lever having a hub portion provided at one end with a radial flange, and a flange on the cone having interengagement with the flange on the lever hub member whereby to cause the cone member to move into and out of braking position when the lever is rocked on the shaft.

3. In a brake construction, a brake drum, a brake engageable therewith, inclined key members connecting the brake to its support, the inclination of the key members being such that the rotation of the drum tends to draw the brake into braking engagement with the brake drum, and means for moving said brake toward said brake drum.

4. In a brake construction, a rotatable brake drum, a non-rotatable brake engageable therewith, key members inclined slightly and connecting the brake to its support, the inclination of the key members being such that rotation of the brake drum and brake tends to draw the brake drum into closer braking relation, and means for moving said brake toward the brake drum, substantially as and for the purpose described.

MARK EDWIN ANDREWS.